(12) United States Patent
Hoehn et al.

(10) Patent No.: US 6,747,648 B2
(45) Date of Patent: Jun. 8, 2004

(54) WEBSITE ON THE INTERNET FOR AUTOMATED INTERACTIVE DISPLAY OF IMAGES

(75) Inventors: Thomas J. Hoehn, Rochester, NY (US); Matthew H. Bernius, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 201 days.

(21) Appl. No.: 10/051,328

(22) Filed: Jan. 18, 2002

(65) Prior Publication Data

US 2003/0137512 A1 Jul. 24, 2003

(51) Int. Cl.⁷ .............................................. G06T 17/00
(52) U.S. Cl. ....................... 345/428; 345/839
(58) Field of Search ................................ 345/428, 629, 345/660, 839

(56) References Cited

U.S. PATENT DOCUMENTS

| 6,012,071 | A | * | 1/2000 | Krishna et al. | 715/522 |
| 6,281,874 | B1 | * | 8/2001 | Sivan et al. | 345/660 |
| 6,335,746 | B1 | * | 1/2002 | Enokida et al. | 345/839 |
| 6,545,687 | B2 | * | 4/2003 | Scott et al. | 345/629 |

* cited by examiner

Primary Examiner—Mark Zimmerman
Assistant Examiner—Hue Dong X. Cao
(74) Attorney, Agent, or Firm—Peyton C. Watkins

(57) ABSTRACT

A website on the Internet for interactive display of images comprises a Web page having a plurality of low resolution images; a high-resolution, insert portion positioned on the Web page which displays one of the plurality of images in a resolution greater than the predetermined resolution for that image as displayed as the low resolution image; and one of the plurality of images automatically displayed in the high-resolution, insert portion based on which of the plurality of low-resolution images senses a graphical user interface superimposed thereon.

10 Claims, 5 Drawing Sheets

WEBSITE ON THE INTERNET FOR AUTOMATED INTERACTIVE DISPLAY OF IMAGES

CROSS-REFERENCE TO RELATED APPLICATIONS

The present application is related to U.S. application Ser. No. 10/05 1,427, filed Jan. 18, 2002, by Thomas J. Hoehn and Matthew H. Bernius, and entitled, "A Method For Displaying Photo Pages On The Internet"; U.S. application Ser. No. 10/050,980, filed Jan. 18, 2002, by Tina M. Clark, Thomas J. Hoehn and Matthew H. Bernius, and entitled, "A Webpage Authoring Tool That Automatically Modifies Links In An HTML Page Sequence Upon Insertion Of Additional HTML Pages"; U.S. application Ser. No. 09/966, 314, filed Sep. 28, 2001, by Matthew H. Bernius and Thomas J. Hoehn, and entitled, "A Discussion Board of a Website Having Images"; U.S. application Ser. No. 09/944, 551, filed Aug. 31, 2001, by Matthew H. Bemius and Thomas J. Hoehn, and entitled, "A Website Chat Room Having Images Displayed Simultaneously With Interactive Chatting"; and U.S. application Ser. No. 09/907,868, filed Jul. 18, 2001, by Thomas J. Hoehn and Matthew H. Bermus, and entitled, "A Website Using Images As A Navigational Tool For User-Created Photopages On The Internet."

FIELD OF THE INVENTION

The invention relates generally to the field of Web pages on the Internet containing substantially all images and, more particularly, to such Web pages having such images which are automatically converted to a higher resolution upon sensing of a cursor superimposed on the lower resolution image.

BACKGROUND OF THE INVENTION

Currently known and utilized websites include web pages having images for visually enhancing the appearance of the web pages. The images are installed upon creation of the web pages by highly skilled web designers and are not modifiable by subsequent visitors of the web pages. In addition, some web pages also include images that have low-resolution images that are viewable in high-resolution form upon clicking on them with a mouse.

Although the currently known and utilized web pages are satisfactory, they include drawbacks. Typical users of the Internet are not skilled enough to include images on web pages. Creating such web pages would typically require layout design, picture resizing and enhancement, programming and the like which tasks typical users are not capable of performing.

Consequently, a need exists for user-friendly web pages in which typical users can include images therein.

SUMMARY OF THE INVENTION

The present invention is directed to overcoming one or more of the problems set forth above. Briefly summarized, according to one aspect of the present invention, the invention resides in a website on the Internet for interactive display of images comprising (a) web page having a plurality of low resolution images; (b) a high-resolution, insert portion positioned on the web page which displays one of the plurality of images in a resolution greater than the predetermined resolution for that image as displayed as the low resolution image; and (c) one of the plurality of images automatically displayed in the high-resolution, insert portion based on which of the plurality of low-resolution images senses a cursor superimposed thereon.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantages of having low-resolution images on web pages displayed in high-resolution form automatically upon sensing a user rolling over the low-resolution thumbnail image with the cursor. The present invention also permits novice users to include images on web pages in a user-friendly manner. Still further, the present invention also automatically resizes the images and includes a template photo page illustrating the page layout for ease of use in creating the web page.

DETAILED DESCRIPTION OF THE INVENTION

Figure 1:
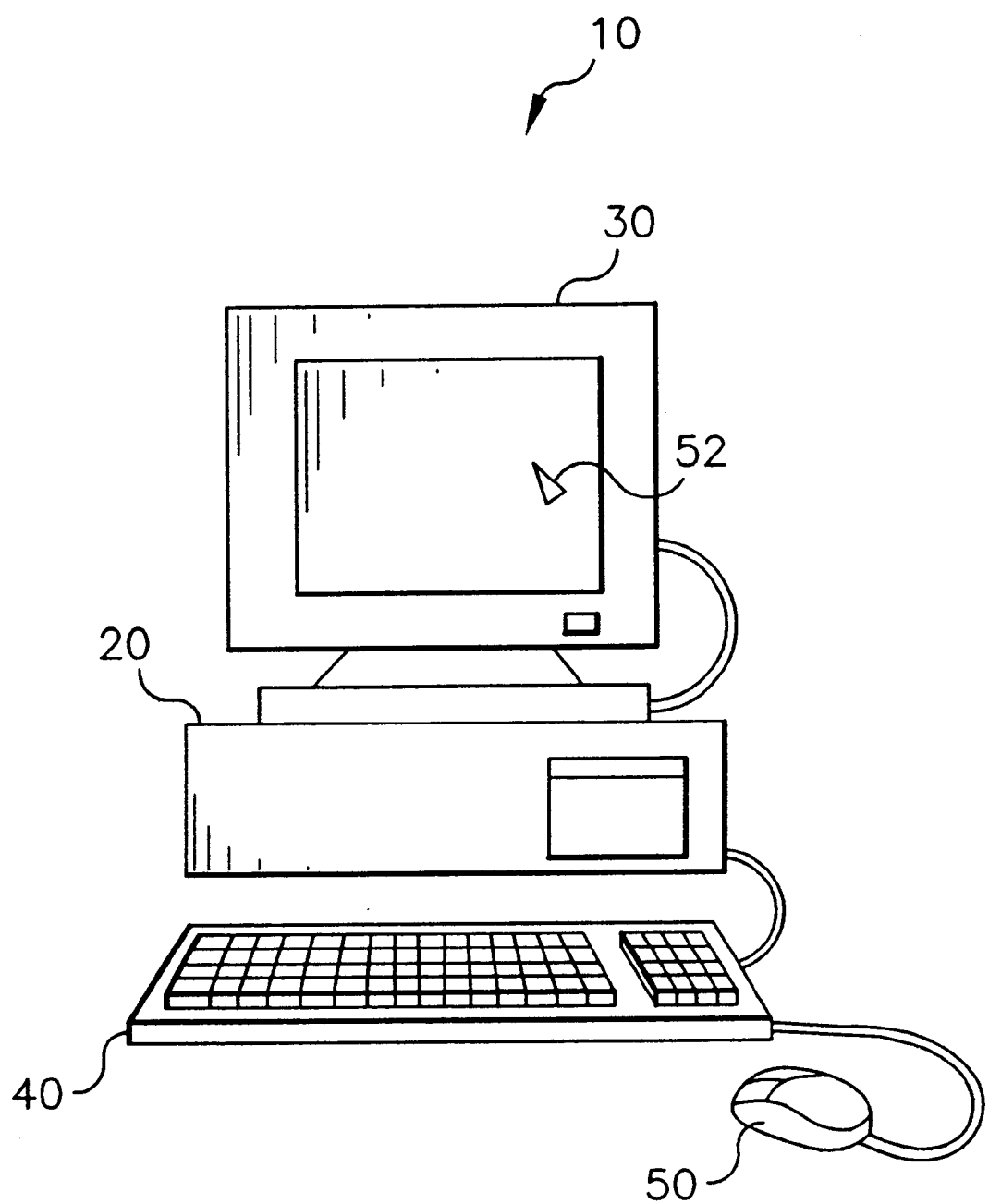
FIG. 1 is a front view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 20 for receiving and processing software programs and for performing other processing functions. A display 30 is electrically connected to the microprocessor-based unit 20 for displaying user-related information associated with the software. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

Referring to FIGS. 2a–2e, there are shown illustrations of a photo page creation tool 53 for assisting the user in inputting images 70 into a web page. Upon accessing the web site, and referring specifically to FIG. 2a, the user is shown a photo page creation tool web page 53 having a template 54 with a plurality of pre-determined, low-resolution thumbnail portions 55 into which the images 70 will eventually be placed in low resolution format. A high-resolution insert portion 56 is adjacent the thumbnail insert portions 55 for displaying one of the thumbnail images in high-resolution format, as will be discussed in detail hereinbelow. The user uploads their images from their computer and the images 70 are placed in the lower portion of the web page in low resolution format, preferably in the order of uploading with the left most image being the first image 70a uploaded. The images are automatically converted into appropriate low-resolution format and size by programming.

Figure 2A:
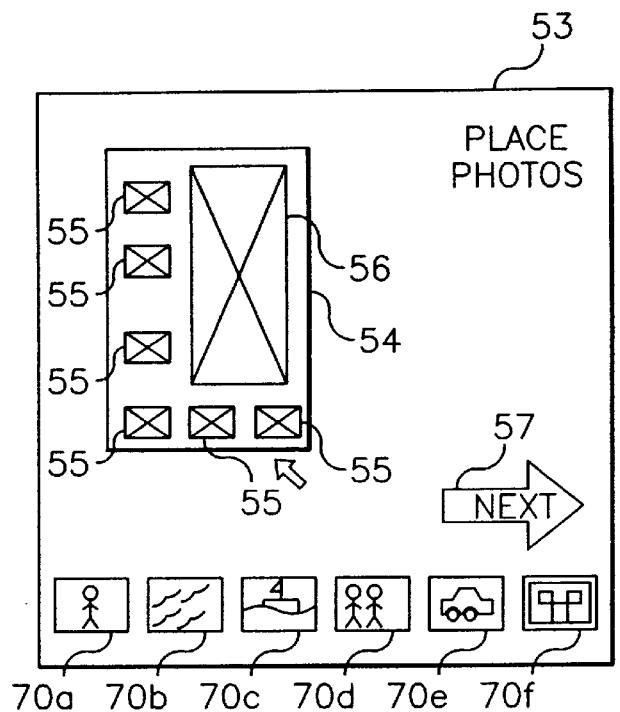
FIGS. 2a–2e are illustrations of a photo page creation tool for inputting images on the web pages.
Figure 2B:
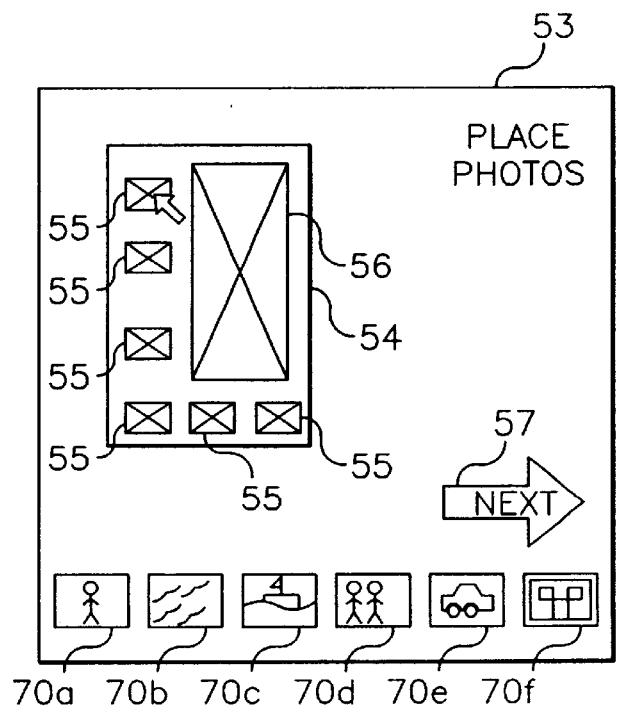
Figure 2C:
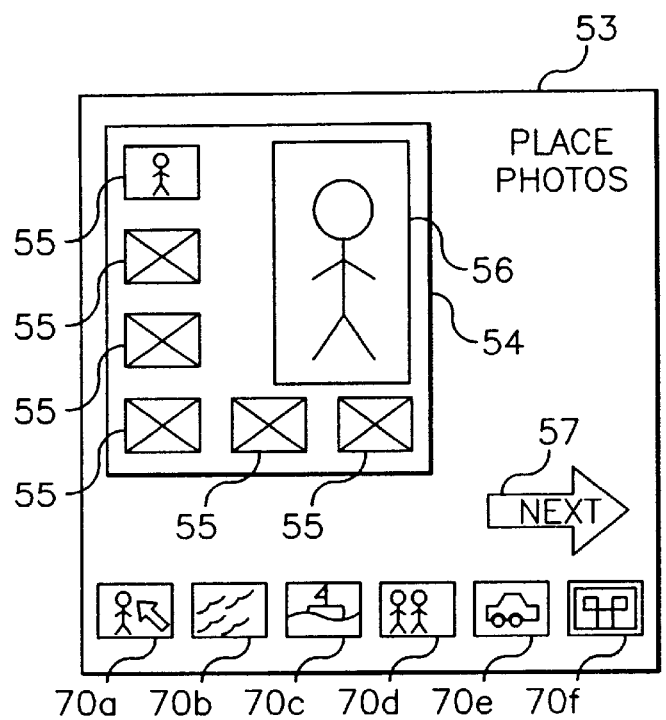
Figure 2D:
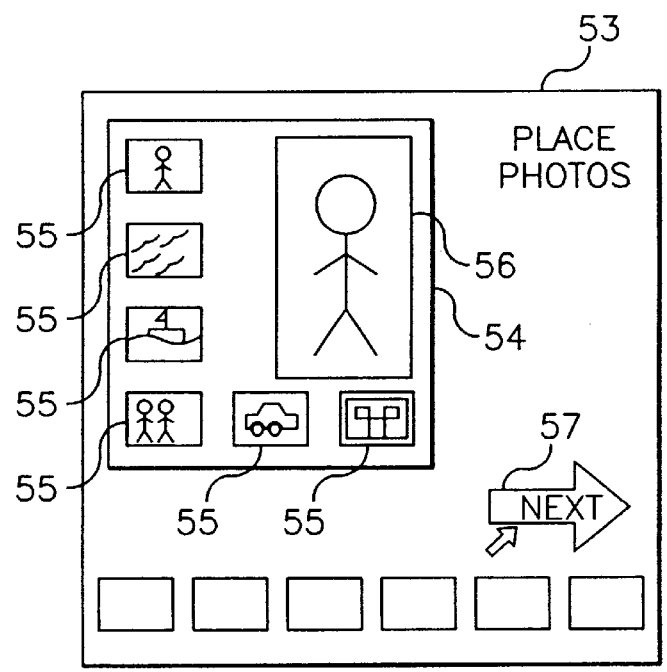

Referring to FIG. 2b, the user positions the cursor 52 over the thumbnail portion 55 into which the first image is to be placed and clicks the mouse 30 for forming a reserved thumbnail portion. Referring to FIG. 2c, the user positions the cursor 52 over the image to be placed into the reserved thumbnail portion and clicks the mouse 50. This causes this image to be inserted into both the reserved thumbnail portion 55 and the high-resolution portion 56. The image 70a is automatically converted into the high-resolution format and appropriate sizing by programming. This process is continued for all of the images 70 in the lower portion until they are all placed into the thumbnail portions 55. It facilitates understanding to note that the first image 70a inserted into the thumbnail portions remains in the high-resolution portion 56. Referring to FIG. 2d, there is shown an illustration of the images 70 inserted into their respective thumbnail portions 55 for clarity of understanding. The user then positions the cursor 52 over the "next" icon 57 for previewing the web page.

Figure 2E:
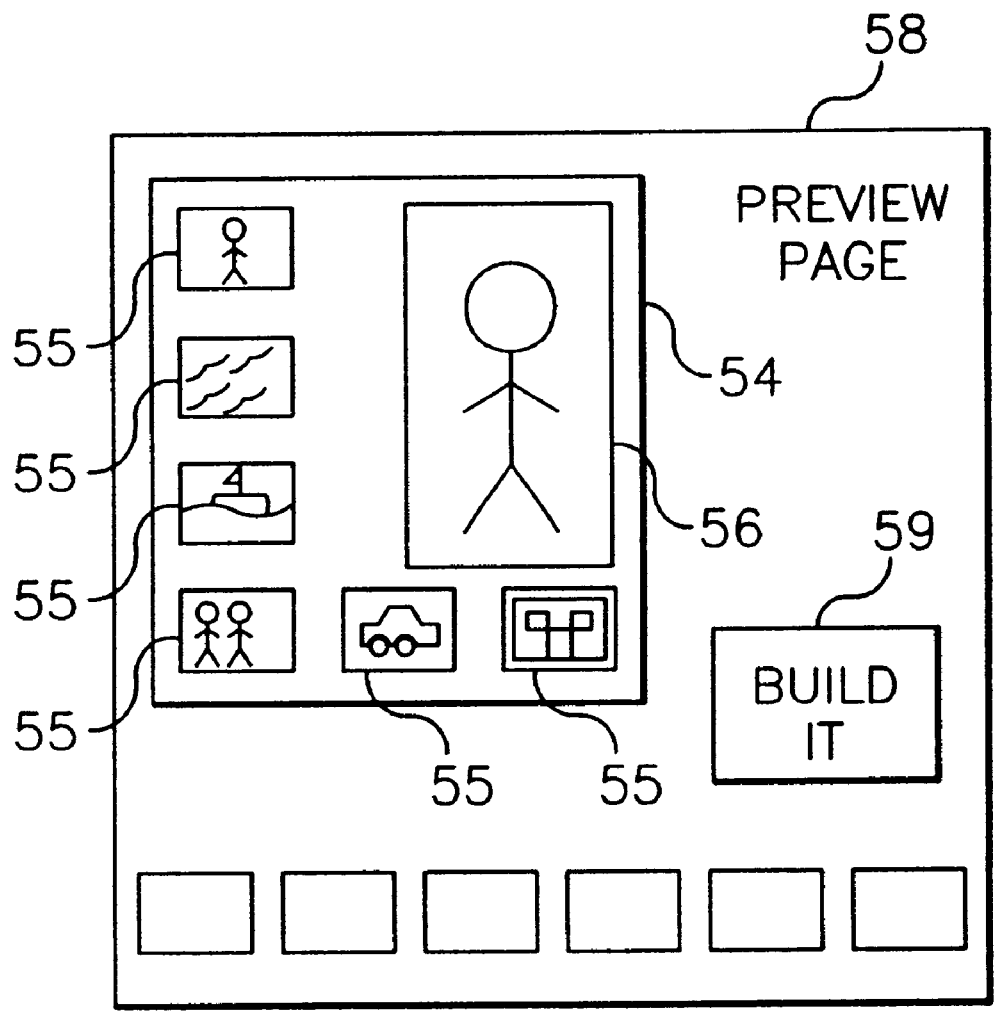

Referring to FIG. 2e, the preview web page 58 is shown having the previously arranged web page design therein. A "build it" icon 59 is displayed adjacent the preview design for permitting the user to create a web page with the preview, if the user is satisfied. Upon clicking on the "build it" icon 59, the html web page is displayed with the images as designed in the photo page creation tool.

Figure 3A:
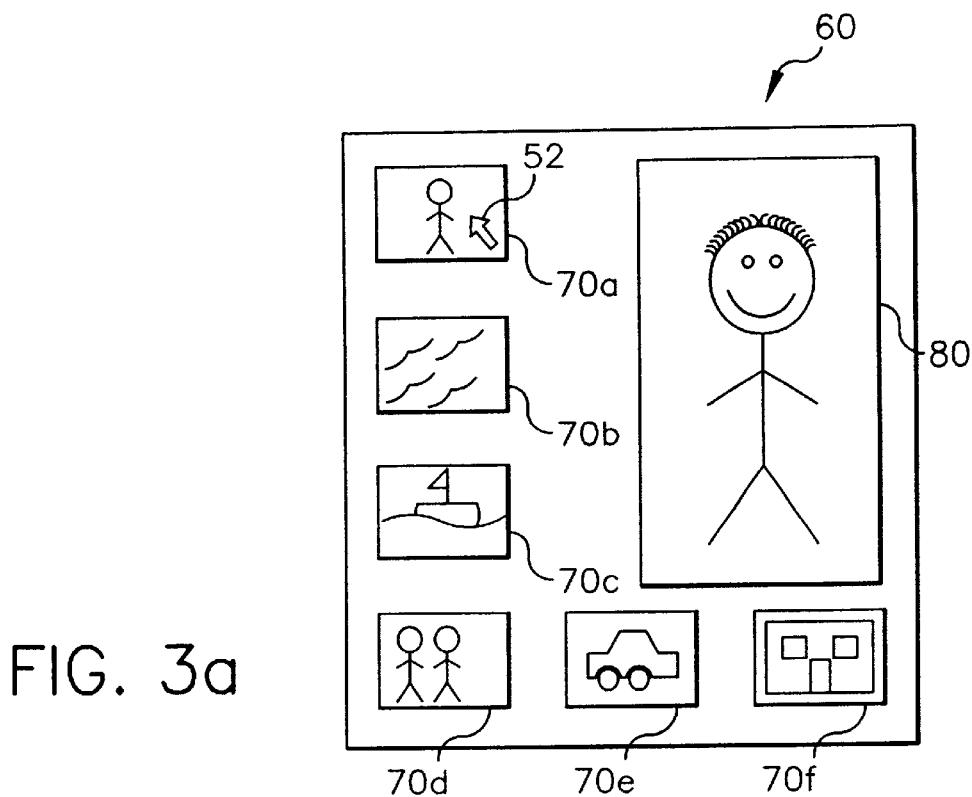
FIGS. 3a–3b are illustrations of the web page of the present invention at progressive points in time.
Figure 3B:
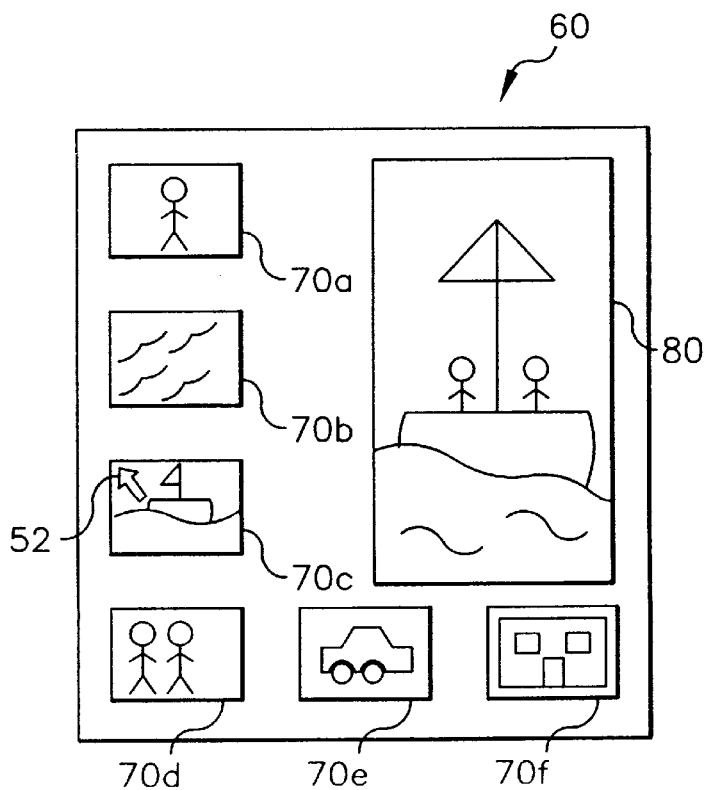

Referring to FIGS. 3a and 3b, there are shown illustrations of the html web page 60 of the present invention at two different points in time for illustrating automated interactive display of images thereon. In this regard, the Web page 60 includes the plurality of low-resolution images 70 positioned in spatially spaced-apart relationships to each other. The images 70 form a customized "photopage" which may be viewed by other Internet users. A high-resolution image 80 is positioned adjacent the low resolution images 70 and is a high-resolution version of one of the low-resolution images 70. The particular image inserted as the high resolution image 80 is determined by the user upon uploading of the images as described above, but may be changed to be either one of the low resolution images 70 as described hereinbelow.

In this regard, the web page 60 includes javascript programming for performing the changing of the high-resolution image. As the user rolls the cursor over the respective images 70 the javascript programming changes the image 70 displayed as the high-resolution image 80 to the image 70 on which the user rolled over the cursor. For example, in FIG. 2a, there is shown the cursor 52 rolling over the image 70a. The javascript programming receives this information and automatically displays the selected image 70a, as determined by the cursor 52, as the high-resolution image 80, if not already displayed there. In FIG. 2b, there is shown another point in time having another image 70 displayed as the high resolution image 80 as determined by received information by the cursor 52.

In an alternative embodiment, the user only uploads one image which is passes through a plurality of filters for creating modified versions of the original image. The filters are, for example, a black and white filter for creating a black and white version, a "cartoon" filter for creating a cartoon version of the original image, and other similar filters for creating other desired versions of the original image. The filtered images, and if desired, the original image are placed as thumbnail images 70 which are inserted into template 70. A high-resolution version of any of the images is created as described hereinabove.

The invention has been described with reference to a preferred embodiment. However, it will be appreciated that variations and modifications can be effected by a person of ordinary skill in the art without departing from the scope of the invention.

Parts List 10 computer system
20 CPU
30 monitor
40 keyboard
50 mouse
52 GUI
53 photo creation tool
54 template
55 low-resolution insert portions
56 high resolution
57 NEXT icon
59 Build It icon
60 web page
70 low-resolution images
80 high-resolution images

What is claimed is:

1. A website on the Internet for interactive display of images comprising:

(a) a web page having a template initially having a plurality of image placeholders that are eventually filled with low resolution, up-loaded images in a predetermined resolution which low resolution images are arranged by a user of the web page;

(b) a high-resolution, insert portion positioned on the web page which displays one of the plurality of images in a resolution greater than the predetermined resolution for that image as displayed as the low resolution image; and (c) one of the plurality of images automatically displayed in the high-resolution, insert portion in the greater resolution format based on which of the plurality of low-resolution images senses a cursor superimposed thereon.

2. The website as in claim 1, wherein the web page senses input from a user mouse which is rolled over the low-resolution image.

3. The website as in claim 1, wherein the low resolution images are uploaded to the web page by an Internet user and formatted into low resolution and high resolution versions.

4. The website as in claim 1, wherein the high-resolution image is automatically resized.

5. The website as in claim 1, wherein one of the low-resolution images is passed through a plurality of filters for creating modified versions wherein the modified versions are at least a portion of the low-resolution images.

6. A method for creating a web page having images, the method comprising the steps of:

(a) creating a photo creation web page comprising the steps of (a1) creating a template initially having one or more content wells that are eventually filled with low resolution, up-loaded images in a predetermined resolution and having high-resolution image portions;

(a2) providing a plurality of user-provided uploaded images on the photo creation web page;

(a3) sensing a cursor for placing the uploaded images into the content wells of the template for filling the image-void content wells with images; and (a4) placing one of the uploaded images into the high-resolution image portions.

7. The method as in claim 6 further comprising the step of (b) creating a preview web page based on the results from steps (a1) through (a4).

8. The method as in claim 6, wherein step (a3) includes sensing the cursor on one of the low-resolution portions and placing the uploaded image which next senses the cursor therein.

9. The method as in claim 7 further comprising the step of assembling the web page with images based on acceptance of the preview web page.

10. The method as in claim 6, wherein step (a2) further comprises passing one of the user-provided images through a filter for creating modified versions, wherein the modified versions are at least a portion of the low-resolution images.

* * * * *